July 25, 1961

C. VAN DER LELY ET AL 2,993,699

DEVICES FOR SPREADING GRANULAR OR
POWDERY MATERIAL OVER A SURFACE

Filed Nov. 7, 1957

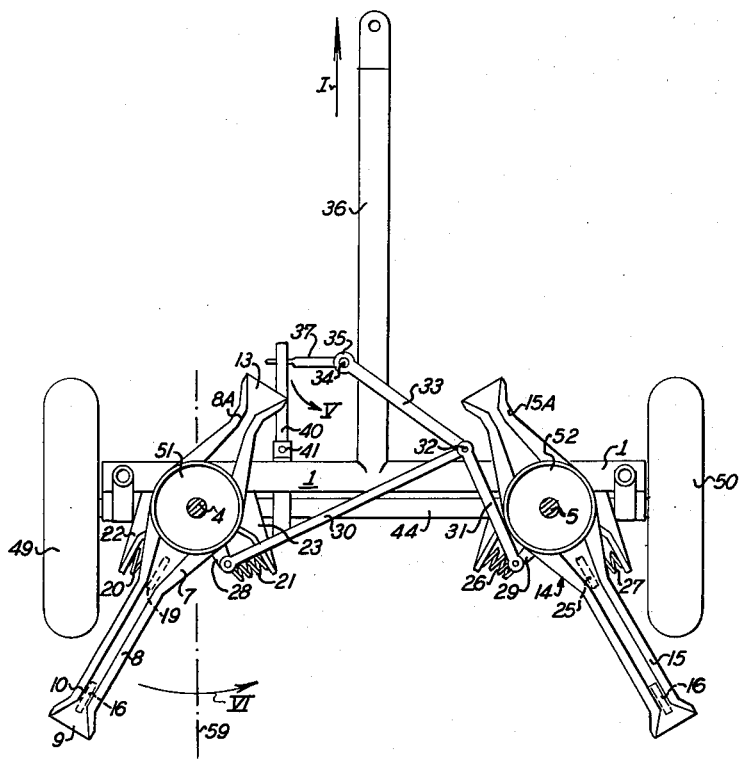
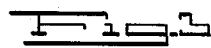

United States Patent Office 2,993,699
Patented July 25, 1961

1

2,993,699
DEVICES FOR SPREADING GRANULAR OR POWDERY MATERIAL OVER A SURFACE
Cornelis van der Lely and Ary van der Lely, Maasland, Netherlands, assignors to C. van der Lely, N.V., Maasland, Netherlands, a Dutch limited company of the Netherlands
Filed Nov. 7, 1957, Ser. No. 695,025
Claims priority, application Netherlands Nov. 9, 1956
16 Claims. (Cl. 275—7)

This invention relates to a device for spreading granular or powdery material over a surface, this device comprising at least one rocking ejector. Devices of this kind are generally known. With such devices the material is spread over the surface by the ejector, the speed of which is at a maximum at the central part of its travel. With this type of ejector, the material to be spread will, however, be distributed irregularly over the surface, whilst the width of spreading of the material differs little from the width of the device.

The invention has for an object the provision of a device of the aforesaid kind which is capable of spreading uniformly the material over a surface, whilst the width of spreading of the material may exceed the width of the device.

In accordance with the invention the speed of the moving ejector is at a maximum near the end of the forward stroke and/or the end of the return stroke. In order to ensure a most favourable distribution of the speed of the ejector throughout its stroke, it is advantageous, in accordance with a feature of the invention, to drive the ejector over the last part of the forward stroke and/or the last part of the return stroke by a mechanism, in which, during the first part of the forward stroke and/or the first part of the return stroke, energy is accumulated, this energy being used for driving the ejector over the last part of the stroke.

A very simple method of driving the ejector over the last part of the forward and return strokes can be obtained, in accordance with one aspect of the invention, by constituting said mechanism by a spring, so that the construction of the device may be cheap.

In accordance with a further aspect of the invention, it is advantageous to limit the stroke of the ejector by a shock-absorbing element, against which the ejector abuts during its movement, so that the speed of the ejector is abruptly reduced to zero. Since the speed of the ejector is abruptly reduced to zero, material tending to adhere to the ejector will be released therefrom, so that even in the case of sticky material the operational width of the device remains large. By using a spring as a shock-absorbing element, the additional advantage is obtained that the ejector performs a vibration at the end of the stroke, which improves the distribution of the material.

In a simple and advantageous form of construction, the ejector is rotatable through a limited angle about an axis, so that the supply of material to the ejector can be performed in a simple manner near this axis of rotation. Conveniently the spring which drives the ejector over the last part of the strokes is secured both to the ejector and the frame, the points of connection of the spring and the pivotal shaft lying substantially in one vertical plane, when the ejector occupies its central position, and these points of connection lying one on each side of the axis

2 of rotation, the spring being stretched in the central position. Thus, by using a spring, the ejector can be driven both over the last part of the forward stroke and the last part of the return stroke.

In one embodiment of the invention, the ejector moves in a direction generally transverse to the direction of travel of the device, so that the operational width of the device is optimum. It is desirable to shape the ejector in the form of a channel, so that the top side of the ejector is open throughout its length and the ejector can be readily cleaned.

The invention relates, furthermore, to a device for spreading granular or powdery material over a surface, the device comprising one ejector, which comprises two channels turning about the same axis. This provides many possibilities of obtaining a uniform distribution of the material on the surface. With such a device these two channels may be arranged at an angle to each other. As an alternative, however, the channels may be parallel to each other. As a rule, it will be structurally easier to arrange the channels in line with each other.

In order to improve a uniform distribution of the material it may be advantageous, in accordance with one aspect of the invention, to arrange one distribution opening of the first channel at a larger distance from the axis of rotation than the distribution opening lying at the end of the other channel.

The invention relates, moreover, to a device for spreading granular or powdery material over a surface, which device comprises two rocking ejectors, the movements of the first and second ejectors being substantially opposed to each other. This provides the advantage that the reaction forces exerted on the device by a rocking ejector can be compensated by the reaction forces originating from the other ejector in opposite direction at the corresponding instants.

A simple construction is obtained by coupling the two ejectors together and by driving them by the same mechanism, so that the number of component parts of the device can be minimized. In order to ensure an optimum operational width by means of two ejectors, the latter may be laterally spaced on the device.

According to a further embodiment of the invention, the device comprises one ejector, having a distribution opening at the end which is wider than the adjacent part of the ejector channel, so that the material is capable of spreading over a certain width around the distribution opening, so that the distribution of the material, after it has left the ejector, is improved. In order to further a uniform distribution of the material, it is desirable to provide the ejector with a second distribution aperture spaced from the end of the ejector in the side wall thereof. If desired, a plurality of such distribution openings may be provided in the side wall or walls of the ejector, it being, in this case, advantageous to arrange these distribution openings at different heights above the bottom of the ejector in a manner such that the openings nearer the end of the ejector are nearer the bottom of the ejector.

The invention will now be described more fully with reference to one embodiment, illustrated in the accompanying drawings, in which:

FIG. 3 is a plan view taken on the line III—III of FIG. 1.

Figure 1:
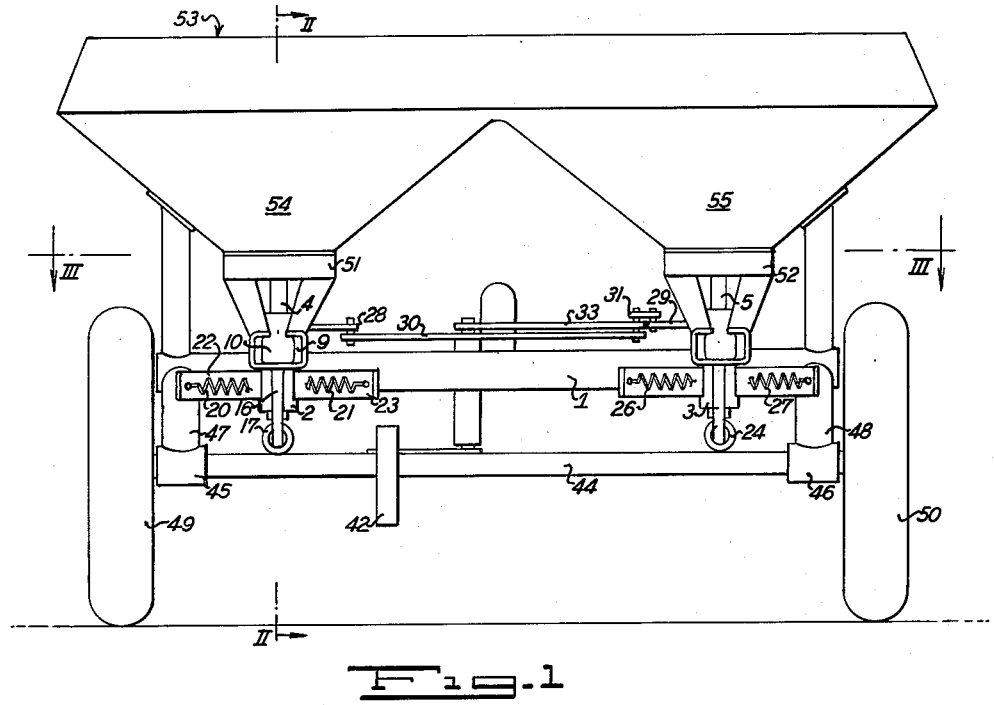
FIG. 1 is a rear elevation of a device according to the invention.
Figure 2:
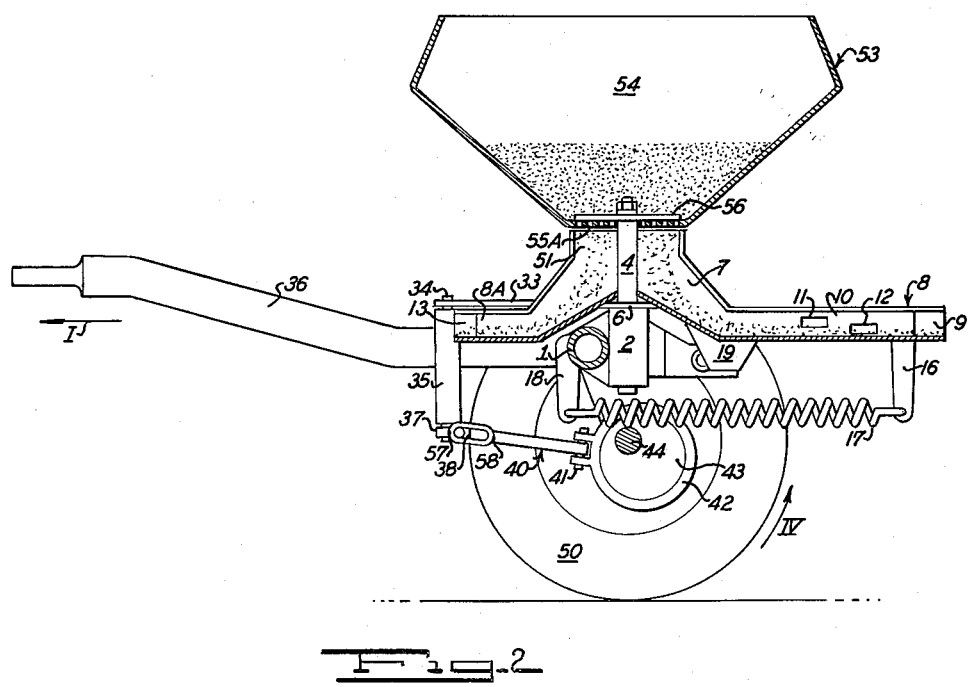
FIG. 2 is a section on the line II—II of FIG. 1.

Referring to the drawings, the device comprises a frame tube 1, carrying bearings 2 and 3 in which shafts 4 and 5 are freely rotatable. These shafts are provided with rings 6, which are shown for the shaft 4 in FIG. 2 and which serve as a support for the shafts on the bearings 2 and 3. The shaft 4 carries an ejector 7, which comprises two channels 8 and 8a, the length of the channel 8 exceeding that of the channel 8a. The channel 8 is provided at its end with a distribution opening 9, which is significantly larger than the adjacent part 10 of the channel 8. It is evident from FIG. 2 that the side wall of the channel 8 is provided with distribution openings 11 and 12 at different distances from the end of the ejector. The heights of these distribution openings 11 and 12 above the bottom of the ejector are different and decrease according to the proximity of the openings to the end of the ejector. The channel 8a is provided at the end with a distribution opening 13, which is shaped in the same form as the distribution opening 9 of the channel 8. The shaft 5 similarly carries an ejector 14, comprising channels 15 and 15a, which are shaped in the same form as the channels 8 and 8a. To the bottom of the ejector 7 is secured a strip 16, with the end of which is connected the end of a dead-center spring 17, the other end of which is secured to a strip 18 connected with the frame tube 1 and located on the opposite side of the shaft 4. To the bottom of the ejector 7 is secured a stop 19, which is located between two thrust springs 20 and 21, which are secured to the frame tube 1 and the bearing 2 by means of arms 22 and 23 (see FIG. 3). The ejector 14 is similarly provided with a draw spring 24 and a stop 25, the stop 25 being located between two thrust springs 26 and 27, which are secured to the frame tube 1 in manner similar to that of the springs 20 and 21. In order to drive the ejectors, the shafts 4 and 5 are provided with arms 28 and 29 respectively. The arms 28 and 29 are coupled by connecting rods 30 and 31, which are each coupled by a pin 32 to an arm 33, which is rigidly secured to a shaft 34 journalled in the bearing 35, which is carried by a draw arm 36, itself secured to the frame tube 1. At its lower end, the shaft 34 carries an arm 37, of which the end is freely movable in a slot 38 of a rod 40. The rod 40 is coupled, by means of a shaft 41, with an eccentric ring 42 surrounding an eccentric disc 43. The eccentric disc 43 is rigidly secured to a shaft 44, journalled in bearings 45 and 46 secured to the frame tube 1 by means of arms 47 and 48. Freely rotatable running wheels 49 and 50 are carried at the ends of the shaft 44. One of these running wheels may be coupled with the shaft 44 by means of known pawl structures, so that the running wheel concerned drives the shaft 44, as the device moves. Near the rotary shaft 4 the ejector 7 is provided with a filling opening 51, and the ejector 14 is provided with a filling opening 52. Over the filling openings 51 and 52 is arranged a hopper 53, which has two funnels 54 and 55, opening over the filling openings 51 and 52. These funnels are provided, as is shown for the funnel 54 in FIG. 2, with apertures 55A and over these apertures 55A are arranged strips 56, which control the discharge of the material through the holes 55A.

The device operates as follows:

When the device moves in the direction I, for which purpose a tractive force is exerted on the front end of the draw arm 36, the ejectors oscillate about the shafts 4 and 5 with one of the running wheels 49 or 50 coupled with the shaft 44, due to the functioning of the eccentric disc 43 and the connecting rods 30 and 31. The ejector 7 moves in the following manner during a forward and return stroke: starting from the position of the ejector as shown in FIG. 3, the rod 40, shown in FIG. 2, occupies the extreme left-hand position, the end of the arm 37 being located in the slot 38 of the rod 40 in a position such that this end is located at a given distance from the points 57 and 58. During the travel of the device, the eccentric disc 43 will turn with the shaft 44 in the direction of the arrow IV. Thus the point 57 (see FIG. 2) will move to the right and touch the end of the arm 37. Thus the arm 37 will start rotating with the shaft 34 in the bearing 35 in the direction V, so that the ejector 7 turns about the shaft 4 in the direction VI. During this movement of the ejector 7 in the direction VI the spring 17 is stretched, until the ejector 7 occupies a position which coincides with the line 59.

When the ejector 7 is moved slightly beyond the position 59 in the direction VI, the spring 17 will move the ejector further towards the end of the forward stroke, the ejector 7 thus engaging the thrust spring 21. The spring 17 can drive the ejector over the last part of this forward stroke, since the ejector is connected with the eccentric disc 43 via the slot 38 so as to be freely movable. During the movement of the ejector over the last part of the forward stroke, it being driven by the spring 17, the end of the arm 37 will move in the slot 38 from point 57 to point 58. Owing to the drive of the spring 17, the ejector will attain its maximum speed over the last part of the forward stroke, this speed being abruptly reduced to zero at the end of the stroke, when the stop 19 contacts the thrust spring 21. Owing to this abrupt change in speed of the ejector, even a sticky material which may be contained in the ejector 7, will be distributed in a favourable manner from the ejector through the distribution openings 9, 11, 12 and 13. Since the distribution openings 9, 11, 12 and 13 are located at different distances from the rotary shaft 4, the ejected material will reach the ground at different distances from the shaft 4, so that a uniform distribution of the material on the ground will be ensured.

At the end of the forward stroke, when the ejector 7 engages the thrust spring 21, the ejector will perform a vibrating motion owing to the resilient effect of the spring 21, so that the distribution of the material is considerably improved. When the ejector 7 has reached the end of the stroke, the eccentric disc 43, shown in FIG. 2, has not yet arrived at the extreme right-hand position, so that the rod 40 will move slightly further to the right. Thus the point 58 will move away from the end of the arm 37. After the extreme right-hand position of the eccentric disc has been reached, the rod 40 will move to the left, the point 58 thus engaging the end of the arm 37, which thus turns with the shaft 34 in a direction opposed to the direction V. The ejector 7 will thus rotate about the shaft 4 in a direction opposite to the direction VI, the spring 17 being thus restretched until the ejector 7 occupies the position which coincides with the line 59, after which the spring 17 similarly drives the ejector over the last part of the return stroke. The ejector 14 has a motion about the shaft 5 similar to that described in the foregoing for the ejector 7.

Since the ejectors 7 and 14 are linked to each other by means of the coupling members 30 and 31, they will always move in synchronism in opposite directions. Thus the reaction forces produced by the movements of the ejectors 7 and 14 and exerted on the device will always have relatively opposite directions and compensate one another, so that the device does not vibrate owing to the rocking movements of the ejectors. Since the supply openings 51 and 52 for the ejectors are located near the shafts 4 and 5 of these ejectors, the material can be readily supplied from the container 53 to the ejectors. The material is supplied by a rocking movement of the arms 56, which are connected with the shaft 4, for example, over the openings 55A, through which the material passes out of the container 53 to the ejectors. The distribution of the material may, furthermore, be varied by omitting the distribution openings 11 and 12 or be providing them at other places in the ejectors. However, it will always be advantageous to arrange the distribution openings nearer the shaft at the maximum height over the bottom of the ejectors, so that the supply of material to these distribution openings is at an optimum level.

Since this device is particularly suitable for spreading artificial fertilizers over fields, it is advantageous to shape the ejector in the form of a channel, so that, when using fertilizers which adhere readily to the ejector, cleaning of the ejector is facilitated.

Although with the embodiment shown an ejector is always provided with two channels, use may be made, as an alternative, of an ejector having one channel; it may, moreover, be advantageous, in order to obtain a particular distribution of the material on the ground, to have an ejector driven only over the last part of the forward stroke or over the last part of the return stroke by a spring, for example the spring 17. In order to ensure a maximum operational width of the device, it is advantageous to have the ejectors move as much as possible in a direction transverse to the direction of travel of the device.

What we claim is:

1. Apparatus for spreading material over a surface comprising an ejector for distributing the material onto the surface and means coupled to the ejector and oscillating the same between spaced positions at a varying speed having a maximum adjacent at least one of said positions.

2. Apparatus for spreading material over a surface comprising a source of said material, distributing means operatively associated with said source for receiving material herefrom and discharging said material, and means engaging the distributing means and oscillating the same between spaced positions at a varying speed having a maximum adjacent at least one of said positions.

3. Apparatus comprising a source of material, ejecting means operatively associated with said source to receive material therefrom and defining at least one opening for the discharge of said material, and oscillating means engaging the ejecting means and oscillating the same between two extremities and accelerating the ejecting means from a position substantially midway between the extremities to a maximum speed adjacent at least one of the extremities.

4. Apparatus comprising a source of material, ejecting means operatively associated with said source to receive material therefrom and defining at least one opening for the discharge of said material, and oscillating means engaging the ejecting means and oscillating the same between two extremities and accelerating the ejecting means from a position substantially midway between the extremities to a maximum speed adjacent at least one of the extremities, said oscillating means comprising a dead center spring arrangement having a dead center position midway of said extremities.

5. Apparatus comprising a mobile frame, a source of material mounted on the frame, means defining a channel operatively disposed with respect to said source for receiving material therefrom, the channel having at least one opening for discharging the material, said means being pivotally mounted on the frame so that the channel is pivotal through a substantially horizontal plane, and means engaging the first said means and pivotally oscillating the same in said plane between two extreme positions at a varying speed reaching a maximum adjacent said positions.

6. Apparatus for spreading a material comprising a material source, a mobile frame supporting the source, a pivotal ejector device on the frame for receiving material from the source, a lost motion linkage on the frame for pivotally oscillating said ejector device between two angularly spaced positions, means engaging the ejector device for accelerating the oscillation of the latter towards the positions in advance of the oscillation caused by said linkage, said means being effective only over a portion of the distance between the positions and being further effective to accelerate the ejector device to a maximum speed adjacent the positions, and resilient abutment means on the frame to terminate oscillatory movement of the ejector device at said positions.

7. Apparatus for spreading material on a surface comprising a mobile source of material, an oscillatable ejector device operatively disposed with respect to the source to receive material therefrom, and means engaging and oscillating said ejector device; said ejector device having an elongated channel with one end adjacent the source for receiving the material and another end open for discharging the material, the channel having lateral openings at different distances from the source and at different distances from the surface.

8. Apparatus for spreading material comprising a material source, a frame supporting the source, at least two ejectors, spaced vertical shafts on the frame supporting the ejectors for receiving material from the source and for pivotal movement, and means engaging the ejectors and oscillating the same between respective angularly spaced positions on the shafts at a varying speed having a maximum adjacent at least one of said positions.

9. Apparatus for spreading material comprising a material source, a frame supporting the source, at least two ejectors, spaced vertical shafts on the frame supporting the ejectors for receiving material from the source and for pivotal movement, and means engaging the ejectors and oscillating the same between respective angularly spaced positions on the shafts at a varying speed having a maximum adjacent at least one of said positions, said means oscillating the ejectors in opposed rotary directions.

10. Apparatus for spreading material comprising a mobile frame, a hopper for said material on the frame and having a discharge opening, two ejectors extending in substantially opposite directions, a shaft on the frame supporting the ejectors for pivotal oscillatory movement and for receiving material from the hopper, and means engaging the ejectors for oscillating the same between two positions and accelerating the ejectors to maximum speed adjacent the positions.

11. Apparatus for spreading material on a surface comprising a frame, wheel supporting the frame for ground traversing movement, a hopper on the frame for said material, the hopper having discharge openings, vertical shafts on the frame in correspondence with the discharge openings, ejectors on the shafts for receiving material from said hopper, a lever system engaging the ejectors for pivoting the same, a lost motion linkage coupled to the lever system for actuating the latter to oscillate the ejectors, an eccentric driven by one of said wheels and in turn thereby, dead center spring arrangements on the frame and connected to the ejectors whereby the latter are accelerated to a maximum speed toward the end of each oscillatory movement, and resilient abutments of the frame for limiting the oscillatory movement of the ejectors and imparting a vibratory movement thereto.

12. Apparatus as claimed in claim 11 wherein the ejectors define channels extending in opposite directions from the shafts, the channels terminating in flared end openings and having lateral openings at different distances from the shafts and surface.

13. Apparatus as claimed in claim 11 wherein said hopper comprises a container common to all of the ejectors and depending funnels coupled to the container and operatively disposed with respect to the ejectors.

14. Apparatus as claimed in claim 11 comprising a draw arm on the frame for applying a tractive force to the latter.

15. Apparatus as claimed in claim 11 wherein the vertical shafts are horizontally spaced; said lever system comprising arms pivotally connected to the ejectors, a pivot connecting the arms, a further arm connected to the pivot for controlling the angular relationship of the first said arms, and a shaft connected to said further arm and to said lost motion linkage.

16. Apparatus as claimed in claim 15 comprising an arm on the shaft of the linkage, the lost motion system comprising an element with an elongated slot accommodating the latter said arm.

References Cited in the file of this patent

UNITED STATES PATENTS

| | | |
|---|---|---|
| 154,842 | Codville | Sept. 8, 1874 |
| 1,189,105 | Heaps | June 27, 1916 |
| 1,558,282 | Prang | Oct. 20, 1925 |
| 1,629,248 | Bailey | May 17, 1927 |
| 1,788,779 | Regester | Jan. 13, 1931 |
| 1,797,112 | Welsh et al. | Mar. 17, 1931 |
| 2,295,472 | Hopkins | Sept. 8, 1942 |

FOREIGN PATENTS

| | | |
|---|---|---|
| 386,495 | Great Britain | Jan. 19, 1933 |